Patented Feb. 17, 1953

2,628,915

UNITED STATES PATENT OFFICE 2,628,915

METHOD OF PREPARING REFRACTORY BONDING MATERIAL

Leslie W. Austin, San Jose, and James C. Hicks, Menlo Park, Calif., assignors to Kaiser Aluminum & Chemical Corporation, a corporation of Delaware No Drawing. Application January 12, 1949, Serial No. 70,594

19 Claims. (Cl. 106—58)

This invention relates to an improved bonding composition for non-acid refractory aggregates, and to a process for preparing such bond-forming material. More particularly, the invention relates to a bond-forming composition of active forsteritic material, and to a process for preparing the same from magnesia or a magnesia-yielding compound and silica, which material is adapted to form without fusion a forsterite bond, for example, in the interstices between non-acid refractory grains.

Forsterite is the mineral term for magnesium orthosilicate, $2MgO \cdot SiO_2$ or $Mg_2SiO_4$, which is known to be an excellent bond for non-acid refractory aggregates because of its high melting point, volume stability, and resistance to corrosion in the usual high temperature furnace environments. However, when starting with pre-formed well-crystallized forsterite it has been difficult to take advantage of these desirable properties, and also obtain good intermediate bonding effects, if it be used as a starting material for a bond to obtain non-acid refractories characterized by high density or low porosity, high hot load strength, high spalling resistance, and resistance to corrosion. As shown in Austin, U. S. Patent 2,434,451, issued January 13, 1948, forsterite can be formed as a bond in the interstices between refractory grains by the reaction of extremely finely divided magnesia and silica without fusion. While the preferred silica material is volatilized silica, which is recovered from the fume arising from reduction furnaces treating silica or siliceous materials, other fine silicas having a specific surface greater than about 6000 square centimeters per gram are useful in the process of the patent.

However, certain of these silicas have been difficult to use and the results secured have not always been as outstanding in some respects as those achieved with volatilized silica. One difficulty that has arisen is that certain silicas, for example, diatomaceous earths highly desirable because of their availability and low cost, having larger particle size than the volatilized silica are nevertheless bulky, and require high forming pressures in shaping and more careful control in sizing and mixing in order to cause them to interdisperse properly with the magnesia component of the bonding material. A similar difficulty has been noted with silicas finer than volatilized silica. In other words, with such fluffy materials in the bond it requires very high pressures to press a refractory body which is as dense and strong as those which can be made when volatilized silica is employed. However, such high forming pressures tend to result in laminations which become evident under more severe operating conditions. On the other hand, in the absence of high forming pressures these fluffy silicas of low bulk density, although eminently reactive to form a strong forsterite bond in situ with magnesia upon firing, cause formation of refractory shapes of insufficient density and undesirable porosity.

It has previously been known to prepare well-crystallized forsterite and to admix such forsterite in refractory batches. However, when the shape drefractory is fired, for example, in use, a satisfactory bond is not developed due to the unreactive nature of the well-crystallized forsterite.

It is a primary object and purpose of the present invention to provide an improved bonding composition for non-acid refractory grains characterized by a bulk density sufficient to produce dense refractories of low porosity while at the same time possessing a reactivity by which a well-crystallized refractory forsteritic bond is obtained without fusion upon firing.

Another object is to provide a process for preparing an improved bonding material for non-acid refractories from magnesia or a magnesia-yielding compound and silica whereby finely divided silicas of relatively low bulk density and fluffy nature may be employed, the bonding material resulting nevertheless having a relatively high bulk density coupled with an activity sufficient to form a strong refractory forsteritic bond.

A further object is to provide a novel bonding composition of active forsteritic material for non-acid rafractory aggregates characterized by the unusual condition of the magnesia and silica components whereby a high intermediate strength of the refractory results when fired to intermediate temperatures due to development of a ceramic bond.

Another object is to provide a process for preparing an improved bond-forming material of an active forsteritic material for non-acid refractories which permits the use of readily available relatively cheap silicas without necessitating high forming pressures to obtain a high density low porosity refractory, the bond-forming material being characterized by a high activity by which a strong refractory forsteritic bond is formed in situ upon firing at moderate temperatures.

It has been discovered according to the present invention that the foregoing objects and other advantages may be realized by thoroughly admixing finely divided silica and a finely divided magnesium compound including magnesia, or a compound yielding magnesia upon calcining, and then calcining, baking or firing the mixture for a sufficient time and at a temperature to convert the magnesium compound to the oxide and to obtain an active forsteritic material having a bulk density of from about 45 pounds to about 85 pounds per cubic foot when of a particle size wherein substantially all particles are less than 200 mesh. The composition obtained by such calcining or baking is then very finely powdered and is useful as a bonding component of a refractory batch, wherein, upon firing below the fusion point of the bonding material, complete reaction between the silica and magnesia takes place to form an excellent well-crystallized forsteritic ceramic bond between the grains of the refractory aggregate and a high density, high strength refractory. This ceramic bond is principally well crystallized forsterite but may have magnesia or periclase, associated therewith.

Magnesium compounds useful in forming the bonding material are those which will yield magnesium oxide under the conditions of calcining or baking the starting material. The magnesium compound should be very finely divided, and the compounds useful include, for example, magnesium hydroxide, brucite, magnesite, magnesium carbonates and the like. Preferably, in order to more easily ensure the proper state of subdivision, the magnesium compound is a precipitated magnesium compound. Among these are included, for example, precipitated magnesium hydroxide obtained by treating sea water or brines with lime or dolomite or other alkali, precipitated magnesium carbonate or basic carbonate and finely divided magnesium alcoholates. Very finely divided caustic magnesia, which has not been fired under conditions to effect shrinkage and crystallization equilibrium, is also useful as a magnesium compound starting material in this invention. Such magnesia can hydrate if employed in suspension in water, for example, to form at least a substantial proportion of magnesium hydroxide, and magnesia will again be obtained upon calcining as described. Mixtures of the magnesia-yielding compounds can be employed. The magnesia-yielding compound is finely divided in order to ensure later reaction without fusion, in use, and preferably substantially passes a 200 mesh screen.

The silica especially benefited by and useful in this invention is finely divided silica having a specific surface of at least about 6000 sq. cm. per gram, and a bulk density of less than about 25 pounds per cubic foot. Preferably, it is amorphous. Such a silica is, for example, a diatomaceous earth, or silica smoke obtained by burning an organic silicate such as ethyl or methyl silicate, or other volatilizable vapors issuing from zones wherein silica or siliceous material is being reduced, or wherein ferrosilicon is being produced. Mixtures of such silicas can be employed in making the bonding material. Diatomaceous earths are a preferred species because of their ready availability and relative low cost. The silica can be in the form of precipitated silica or silicic acid.

The silica and magnesia-yielding constituents are admixed in such proportions that the silica is present in a proportion of from about 20% to about 60% $SiO_2$, based on the total weight of $SiO_2$ and MgO in the baked bonding material. That is to say, the bonding material forms well-crystallized forsterite when later fired in use, and therefore the $SiO_2$ and MgO are suitably present in the proportion of 1 mol of silica per 2 mols of magnesia. However, an excess of either component can be present, in variations of this admixture. When MgO is present in excess, it will be present as periclase in the product fired in use and this is advantageous in some cases, as where a higher refractoriness or more basic bonding material is desired. In other words, it is sometimes advantageous to form a bond which is a mixture of forsterite with excess magnesia or which may be forsterite-magnesia eutectic, and the term "forsteritic bond," where used herein, is to be understood to include forsterite occurring alone or with excess magnesia. When $SiO_2$ is present in excess, sufficient fine magnesia should be added in the refractory batch, in which the bonding material is employed, to form forsterite with all of the excess silica; and, for example, the excess silica will so react with the finer portions of the periclase in a periclase or periclase-containing refractory batch.

The fine silica and fine magnesia-yielding material are preferably interdispersed or intimately admixed in a liquid medium and when thoroughly intermixed are baked or calcined to form the bonding component. The starting materials are suitably mixed, for example, by milling them together, and preferably this milling is carried out on a suspension of the starting materials in a liquid medium. For example, a water slurry is milled to effect the intimate mixing. The mixture of silica and magnesia-yielding compound can be dewatered, as by filtering, and calcined, or it can be filtered, dried and calcined, or the suspension or sludge can be pumped directly to the kiln and dried there and calcined in one operation. The silica can be mixed with a magnesium salt solution prior to precipitation therefrom of the magnesia-yielding compound, and there is then obtained upon precipitation of the latter, as by treating the solution with an alkaline agent to precipitate magnesium hydroxide or with carbon dioxide to precipitate magnesium carbonate or basic carbonate, a very intimate admixture of the compound and the silica which can be then treated as described above. For example, the silica can be admixed with brine or sea water, and magnesium hydroxide then precipitated by addition of an alkaline reagent or alkali such as lime, calcined dolomite, caustic soda, caustic potash etc., in order to get the desired intimate admixture. Or, the silica can be added to the magnesium hydroxide sludge so precipitated, prior to filtration or baking or firing thereof. Silica can likewise be added to a sludge or slurry of magnesium carbonate or other magnesia-yielding compound prior to filtration or baking or firing thereof. While liquids other than water are also useful as suspending media, water is preferred in that it is the cheapest and most easily available liquid. Other liquids are operative, however.

The admixed components are then baked or fired in order to convert the magnesium compound to magnesia and to obtain a forsteritic material having the desired reactivity and bulk density. Extensive tests including X-ray patterns indicate that at least a substantial proportion of the magnesia and silica are present in the form of forsterite crystals of submicroscopic size or of such small size that they can be observed only with difficulty under extremely high magnification. Varying amounts of unreacted magnesia and/or silica may be present depending upon the proportions of starting materials used, and the extent to which the apparent reaction to form incipient crystalline forsterite has occurred.

It is this unusual and unexpected condition of the bonding material components which is believed to result in a bonding material which is highly reactive to form a ceramic bond without fusion or firing and which in conjunction with aggregate forms a dense refractory of low porosity even when employing silicas which are fluffy in character and of relatively low bulk density.

It is apparent from the tests, the reactivity and the bulk density there is no substantial formation of well-crystallized forsterite as distinguished from the submicroscopic or cryptocrystalline, reactive, forsteritic material of this invention. The bonding compositions of the invention have bulk densities of from about 45 to about 85 pounds per cubic foot whereas the bulk density of well-crystallized forsterite, similarly determined is about 120 pounds per cubic foot. Furthermore, in order to secure the good bonding effects which are obtained by the present bonding material and process at the lower portion of the high temperature firing range, as set forth below, formation of a well-crystallized forsteritic ceramic bond takes place in situ. With preformed well-crystallized forsterite this cannot occur and weak bonds result.

In order to obtain the improved bonding material of the invention it is only necessary to calcine or bake the mix until the calcined product has a bulk density of from about 45 to about 85 pounds per cubic foot when of a particle size wherein substantially all particles pass a 200 mesh screen. The optimum density may vary within these limits depending upon the type and proportion of silica used, as well as the particular conditions of temperature and time employed in calcining. The preferred bulk density in general is from about 60 to about 70 pounds per cubic foot.

The conditions of time and temperature in the calcination or baking may be widely varied in obtaining the results desired. The mixture is baked or fired at a lower temperature for a longer time or at a higher temperature for a shorter time until the desired characteristics are produced in the cocalcined mixture of magnesia-yielding compound and silica. It is only necessary that the maximum temperature employed be below that at which inactive well-crystallized forsterite is formed, that is, forsterite crystals of such size that they may be observed with comparative facility under the microscope. Conversely, the minimum temperature must be sufficiently high so that the reaction of magnesia and silica to form incipiently or submicroscopically crystallized forsterite will occur at a satisfactory rate.

Temperatures from about 700° C. to about 1300° C. are indicated as producing satisfactory results with the periods of heating being correspondingly adjusted. However, the particular temperatures employed are not to be deemed critical except as reflected in the production of a cocalcined product having the desired bulk density. In actual practice, the conditions of calcining or baking are suitably determined with reference to the bulk density of the calcined composition, which is measured by sampling, and the time and temperature of baking or calcining adjusted accordingly to maintain production of a material having a bulk density within the required limits.

The bonding material so prepared is finely ground and is then useful as a bond for non-acid grains in a refractory batch. The material is preferably ground until substantially all passes a 200 mesh U. S. Bureau of Standards screen (74 micron opening), and can be easily reduced to such fineness that a major proportion of particles are about 20 microns in size, which is desirable in properly placing the bond in the refractory batch. Such grinding is preferably done in a ball mill, but, if desired, the material can be ground in a hammer or roller mill, or any desired means. If desired, the oversize portion is removed, preferably by an air classifier. The bonding material can be employed in combination with temporary or chemical bonds. Such bonds can be, for example, magnesium chloride, magnesium sulfate, nitre cake or sodium silicate, and they can be added in amounts of from about 1% to about 4%, based on the total weight of dry ingredients. The bonding material of this invention can also be employed in combination with bonding amounts of chromium compounds. It is desirable that impurities, that is, compounds other than magnesium oxide and silicon dioxide, be kept as low as possible in the bonding material. It is known that the presence of phosphorus inhibits the formation of forsterite, and it is therefore desirable that the silica or other ingredient of the bonding material mix contain not more than about 1.0% of phosphorus calculated as $P_2O_5$. Small amounts, for example up to about 3%, of iron may aid in forming the ceramic bond at lower temperatures, without detrimentally affecting the refractoriness. It is also preferred that CaO and $Al_2O_3$ do not exceed about 2% each, in the calcined product.

It is an advantage of the bonding material of this invention that in combination with the chemical bonds it produces refractory articles having excellent cold and fired strengths and also unusually good strengths at temperatures intermediate to the drying and firing or service temperatures. It is a further advantage of the method that it provides that a fluffy silica, i. e. of low bulk density, can be admixed with the magnesia-providing component in the desired amount to form a forsteritic material and be pre-dispersed, as it were, to produce a compact bond-forming ingredient, and also provides that the formation of the ceramic that is, well-crystallized forsteritic bond will take place later, in the ultimate firing, with production of the desired lower-temperature ceramic bond and a high-density refractory.

As an example of the method of carrying out this invention, a finely divided precipitated magnesium hydroxide, obtained by reacting sea water with calcined dolomite, thickening and washing to remove impurities, particularly calcium compounds, is pumped to a mixing tank. The slurry of magnesium hydroxide and water is preferably adjusted to such density that it will remain mobile after the addition of the silica to permit pumping and to insure better interdispersion with the silica. Preferably, the solids content of the slurry is adjusted to from about 12 to about 17 per cent by weight, calculated as magnesium hydroxide. The slurry is agitated vigorously by any suitable device assuring good shearing and mixing of the pulp, and sufficient diatomaceous earth is admixed therewith to give a content of from about 35% to about 45% of SiO₂ in the calcined product. The diatomite used is pulverized to pass a 325-mesh screen (44 micron opening), and about 13% is finer than 1 micron, by sedimentation test. The mixing is suitably done by means of a turbine mixer or a high speed propeller or the like, and the contents of the tank can, if desired, be circulated by a centrifugal pump of a capacity to handle the contents of the tank at least several, and preferably many, times during the mixing period. Alternatively, the mixing can be carried out in a ball mill.

When uniformly blended, the mixture is filtered, yielding a cake containing approximately 50% of solids as magnesium hydroxide plus silica, and the filter cake is baked or calcined. The calcining is suitably effected in a rotary kiln and the product has a bulk density, as measured on the calcined material, which has been ground in a hammer mill until about 95% passes a 200-mesh screen and then compacted by tapping, of between 60 pounds and 70 pounds per cubic foot. After calcining and prior to using, the product is ground in a ball mill until substantially all of it passes a 200-mesh screen. While baking or calcining of the bonding material has been described in the above example as being carried out in a rotary kiln, other devices can be employed for this calcination.

It has been found that excellent bulk densities are obtained by baking or calcining the mixture at about 1100° C. for about one-half hour, but a higher temperature can be employed for a shorter time or a lower temperature for a longer time, but in no case exceeding the time in which there are obtained bulk densities within the desired range. The preferred temperature range is from about 900° C. to about 1200° C.

The bond material so prepared can be employed in making shaped refractory articles or it can be employed as a mortar. It can be employed in amounts of from about 5% of the total fired product, as in a brick or other shaped refractory, to 100% when used as a mortar. In general, somewhat more (by weight) of the bond can be used when the initial firing of the bond material has been prolonged or at a higher temperature so as to result in a denser product than when the product is of a lower bulk density.

Instead of starting with precipitated magnesium hydroxide prepared as above, the starting material can be also magnesium hydroxide precipitated from more concentrated brines by any desired alkaline reagent, such as caustic soda, lime, hydrated lime, etc., or it can be precipitated magnesium carbonate or basic magnesium carbonate, or it can be very finely divided active magnesia. The term "magnesia-yielding constituent (or compound)" as used herein is intended to mean either magnesia, or a compound of magnesium which upon calcining breaks down to give MgO, and which upon firing (under more severe conditions) yields periclase.

The bonding material is useful in forming bricks with various types of non-acid grains, as for example, in making a chrome-magnesia refractory in which the principal refractory aggregate ingredient is chromite or refractory grade chrome ore. The chromite is crushed and sized, and 62.50% by weight of the crushed chromite is employed in the batch, distributed in sizes as follows: 45% passing 5 mesh and retained on 14 mesh, 8.75% passing 14 mesh and retained on 22 mesh and 8.75% passing 22 mesh and substantially retained on 40 mesh. With the chromite is admixed 8.75% of periclase of from 20 to 30 mesh size and 15.50% of periclase passing 100 mesh, and to the mixture is added 2.25% of magnesium sulfate dissolved in 3% of water and the whole is thoroughly blended. Then there is added with thorough blending 8.00% of bonding material prepared as described above, starting with magnesium hydroxide sludge derived from sea water and containing 36% SiO₂ and having a bulk density, after roller-mill grinding, of 62 pounds per cubic foot. The mix is pressed into bricks under a pressure of 10,000 pounds per square inch, and the bricks are cured.

After curing, these bricks are cut into cubes, two inches on a side, and are tested for crushing strengths after having been fired to various temperatures, with the following results:

*Table I*

| Fired at °C. | Crushing stress Pounds/sq. in. |
| --- | --- |
| Green (unfired) | 6,963 |
| 400 | 5,375 |
| 600 | 3,450 |
| 800 | 3,325 |
| 1,000 | 3,125 |
| 1,200 | 5,875 |
| 1,500 | 3,900 |
| 1,700 | 6,250 |

It will be noted that even at the intermediate firing temperatures, where the bonding effect is generally the weakest because of the breakdown of the chemical bond and because this is prior to complete formation of the ceramic bond, the strengths of these bricks remain very high. In a spalling test, where bricks of the above batch are placed as a cold panel exposed to furnace temperature of 1400° C. for 45 minutes to bring the panel to 1400° C., then blasted with cold air for 15 min., then returned to the furnace exposure for 15 min., and so on for 10 complete cycles, the average spalling loss is 6.7%. When fired under a load of 25 lbs. per sq. in., these bricks withstand temperatures in excess of 3000° F. without failure by shearing.

In another variation, where a similar mix is prepared according to the invention but employing magnesium chloride as the chemical bonding ingredient, the bricks also have good crushing strengths, and when fired under a load of 25 lbs. per sq. in. withstand temperatures in excess of 3000° F. without failure by shearing. Spalling resistance on a standard spalling panel test is equivalent to the best chrome-magnesia refractories.

There are shown in Table II, below, the results of further examples of the method of carrying out the invention. Six refractory batches are prepared in which there are admixed periclase grain material in the proportion of 40 parts by weight passing 5 mesh and retained on 10 mesh, 20 parts by weight passing 20 mesh and retained on 30 mesh and 27.5 parts by weight passing 200 mesh, 2.5 parts by weight of $MgSO_4 \cdot 7H_2O$ dissolved in 3.5% (based on the total weight of the dry ingredients) of water, and 10 parts by weight of dry bonding material as follows.

In batch No. 1, the bond is prepared by milling together in a ball mill a proportion of 1.25 parts of finely divided active (caustic) magnesia obtained by calcining magnesium hydroxide precipitated from sea water, per 0.75 part of diatomaceous earth, with water to make a slurry.

In batch No. 2, the bond is prepared by admixing in the same way the same proportions of finely divided active magnesia obtained by calcining a natural magnesite of high purity (containing on the ignited basis about 98% MgO) and of diatomaceous earth. In batch No. 3, the bond is likewise prepared in the same manner except that as the magnesia source there is employed a commercial periclase passing 200 mesh.

In batch No. 4, the bond is prepared by thoroughly admixing in a mixer providing good shearing action, a proportion of 16.67 parts by weight of a thick sludge of finely divided magnesium carbonate obtained by the known method of carbonation starting with sea water and containing 7½% equivalent MgO, per 0.75 part by weight of diatomaceous earth, and water to make a slurry.

In batch No. 5, the bond is prepared by admixing as in batch No. 4 a proportion of 2.5 parts by weight of a filter cake of finely divided magnesium hydroxide obtained by treating sea water with calcined dolomite and containing 25% equivalent MgO, per 0.375 part by weight of a fluffy silica having a maximum particle size of 50 millimicrons and a bulk density of about 3 pounds per cubic foot, and water to make a slurry.

In batch No. 6, the bond is prepared by ball-milling, with water to make a slurry, a proportion of 2.66 parts by weight of a natural magnesite (containing on the ignited basis about 98% MgO) equivalent to 1.25 parts by weight MgO, per 0.75 part by weight of diatomaceous earth.

In each of these bonding mixtures, the diatomaceous earth, where used, substantially all passes 325 mesh. The bonding mixtures are dried and are placed in a kiln where they are calcined for one-half hour at 1100° C. The bulk densities determined on the calcined bonding compositions after grinding, are between 75 and 84 lbs. per cubic foot. The calcined bonding mixes are then ground until substantially all passes 200 mesh and are employed in preparing refractory batches according to the formula given above. The batches are pressed into test pieces, under pressures of about 10,000 lbs. per sq. in., cured and fired to various temperatures, and the cold crushing strengths of the fired pieces determined, as shown in Table II.

*Table II*

| Batch No. | Average Cold crushing Strengths in lbs. per sq. in. at— | | | | | | |
|---|---|---|---|---|---|---|---|
| | 120° C. | 400° C. | 600° C. | 800° C. | 1,000° C. | 1,200° C. | 1,400° C. |
| 1 | 7,900 | 7,400 | 4,850 | 2,800 | 3,400 | 5,900 | 6,800 |
| 2 | 6,800 | 8,350 | 4,700 | 2,700 | 2,900 | 4,900 | 6,150 |
| 3 | 7,100 | 6,300 | 4,450 | 2,300 | 2,500 | 4,800 | 6,500 |
| 4 | 9,050 | 8,850 | 5,600 | 3,700 | 3,700 | 5,400 | 6,200 |
| 5 | 11,200 | 8,100 | 6,500 | 4,950 | 4,200 | 6,600 | 7,300 |
| 6 | 8,150 | 8,450 | 6,200 | 3,100 | 2,700 | 5,500 | 6,100 |

It will be noted that the intermediate strengths are good, and in some cases excellent, and that the formation of the ceramic or high temperature bond takes place in a satisfactory manner and at the lower portion of the high temperature range.

When a brick mix is prepared by admixing grain and bond in the manner described above, but where the bond comprises a mixture of magnesium hydroxide sludge and volatilized silica obtained as a by-product from a furnace wherein ferrosilicon is being produced, the bonding mixture having been calcined according to the invention, the bricks formed therefrom exhibit a minimum cold-crushing strength which is on the average about 1000 lbs. per sq. in. higher than is obtained when employing as bonding components magnesia, obtained by calcining such sludge, and the same silica but without pre-calcining them together. Very good strengths are obtained when operating with the bonding material according to the invention and when a liquid hydrocarbon is employed as tempering medium instead of water.

Besides its use in forming refractory shapes, the bonding material prepared according to the invention is also useful by itself as a mortar for bonding non-acid refractory shapes into a structure. During service, under the heat of the furnace, a ceramic binder of forsterite is formed which is highly refractory and which bonds the shapes to each other. If an air-setting composition is desired a small amount of soluble silicate may be added, for example, from 2 to 4% of sodium silicate. In some cases, in order to minimize shrinkage of the mortar upon firing, as when thicker joints or surfaces are to be built up, ground refractory materials such as periclase, magnesite, olivine, chromite, or non-acid brickbats may be incorporated in the binder. For example, a composition comprising 45% of periclase ground to pass a 60-mesh screen, 53% of the finely powdered bond of the invention, and 2% of sodium silicate powder having a $SiO_2$ to $Na_2O$ ratio of 3.2 to 1 can be blended for use as a mortar. Small amounts of agents such as bentonite or certain organic products may be incorporated to improve the water holding ability, viscosity and/or adhesiveness if desired.

As stated above, the silicas which are especially benefited by the process of this invention are those which have a bulk density of less than about 25 pounds per cubic foot. Due to their fluffy nature they are ordinarily difficult to work into a mix with the time and equipment allotted to industrial practices. These silicas include, besides the diatomaceous earths, silica smoke such as deposited under oxidizing conditions from the burning of volatilizable silicon compounds, very fine silica having a maximum particle size of about 50 millimicron diameter and a bulk density of about 2 to 5 pounds per cubic foot, very fine silica deposited from the vapors issuing from a furnace wherein ferrosilicon is being produced in the known way and having a bulk density of less than about 25 pounds per cubic foot, and the like.

A typical analysis on the ignited basis of a bonding composition prepared, starting with diatomaceous earth and magnesia, according to this invention, is as follows: 36.52% $SiO_2$, 0.58% $Fe_2O_3$, 1.35% $Al_2O_3$, 0.99% CaO, 60.24% MgO, 0.30% ignition loss. In other bonding compositions prepared according to the invention the silica content has been, for example, 48.24% and 24.20% where the magnesia content is 48.47% and 73.76% respectively, on the ignited basis.

The bonding material of this invention is useful as a mortar for non-acid refractory shapes as described above; and is useful as a bond in forming shaped products of non-acid refractory grains. The term "non-acid refractory" as used herein is to be understood to include those refractory materials which are basic or neutral, and are compatible at high temperatures with forsterite, that is, those materials which will not flux with the bond even at the top firing or service temperatures of the bonded refractory article. These service temperatures may range from 1100° C. to 1700° C. or above. Such non-acid refractory materials include, for example, magnesia, forsterite, olivine, natural spinels such as chromite or chrome ore, artificial spinels such as magnesio-chromite, magnesioferrite, or ferrous chromite, and which preferably have melting points in excess of 1700° C.

The above examples and specific description have been given for purposes of explanation and illustration, and variations and modifications can be made therein without departing from the spirit and scope of the appended claims. In the specification and claims all percentages are by weight, except for porosity, which is by volume, unless they are otherwise expressed. The screen sizes referred to herein are U. S. Bureau of Standards screen sizes, and, for example, 200 mesh refers to such screen having 200 meshes to the linear inch, and so forth.

In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the silicon constituent as $SiO_2$ or silicon dioxide and so on for the other elements reported, although the silica or iron oxide and the magnesium oxide, for example, may be present in combination with each other or with another minor constituent. For example, the term "0.58% $Fe_2O_3$" or "of iron as $Fe_2O_3$" is intended to mean that a chemical analysis of the material referred to would show the iron content as 0.58% expressed as $Fe_2O_3$, although in reality all of the iron might be present as a ferrite or in some other combined form.

Having now described the invention, what is claimed is:

1. A refractory bond-forming material consisting essentially of a calcined mixture of finely divided magnesia and from about 20% to about 60%, based on the total weight of MgO and $SiO_2$, of finely divided silica having a specific surface of at least 6000 square centimeters per gram, said material having a substantial proportion of the magnesia and silica components present in the form of submicroscopic crystals of forsterite and having a bulk density of from about 45 to about 85 pounds per cubic foot when of a particle size such that substantially all particles are less than 200 mesh.

2. A refractory bond-forming composition of forsteritic material consisting essentially of a calcined mixture of finely divided magnesia and finely divided silica having a specific surface of at least 6000 square centimeters per gram, said silica being present in an amount of from about 20% to about 60% of the calcined mixture by weight, said material having a substantial proportion of the magnesia and silica components present in the form of submicroscopic crystals of forsterite and having a bulk density of from about 45 to about 85 pounds per cubic foot when of a particle size such that substantially all particles are less than a 200 mesh.

3. A composition according to claim 2 in which the magnesia and silica components are present in the calcined mixture in about forsterite proportions.

4. A refractory bond-forming material consisting essentially of a calcined mixture of magnesia and from about 20% to about 60% of silica, having a bulk density of from about 45 to about 85 pounds per cubic foot when of a particle size such that substantially all particles are less than 200 mesh, a substantial portion of said magnesia and silica being present in combined form as submicroscopic crystals of forsterite.

5. Refractory mortar containing in major amount the refractory bond-forming material according to claim 1.

6. Process of making an active forsteritic refractory bond-forming material which will form well-crystallized forsterite upon firing without fusion, which comprises preparing an intimate admixture consisting essentially of a finely divided magnesium compound which will yield magnesia upon calcining and from about 20% to about 60%, based on the total weight of MgO and $SiO_2$, of finely divided silica having a specific surface of at least 6000 square centimeters per gram and a bulk density of less than about 25 pounds per cubic foot, and calcining said admixture until it has a bulk density of from about 45 pounds to about 85 pounds per cubic foot when of a particle size such that substantially all particles are less than 200 mesh.

7. Process as in claim 6 wherein said admixture is prepared as a suspension in a liquid.

8. Process as in claim 6 wherein said silica is amorphous.

9. Process as in claim 6 wherein there is admixed a finely divided precipitated magnesium compound chosen from the group consisting of magnesium carbonate, magnesium basic carbonate and magnesium hydroxide.

10. Process of preparing an active forsterite refractory bond-forming material which will form well-crystallized forsterite upon firing without fusion which comprises preparing a water slurry of an intimate admixture consisting essentially of amorphous silica having a specific surface of at least 6000 square centimeters per gram and a bulk density of less than about 25 pounds per cubic foot, and at least one finely divided precipitated magnesium compound chosen from the group consisting of magnesium hydroxide, magnesium carbonate and magnesium basic carbonate, filtering said slurry to recover the mixed solids, and calcining said solids at about 1100° C. for about one-half hour.

11. Process as in claim 10 wherein said precipitated magnesium compound is magnesium hydroxide.

12. Process of preparing an active forsteritic refractory bond-forming material which will react to form well-crystallized forsterite upon firing without fusion, which comprises preparing a slurry of an intimate admixture consisting essentially of finely divided precipitated magnesium compound which will yield magnesia upon calcining and a finely divided silica having a specific surface of at least 6000 square centimeters per gram and a bulk density of less than 25 pounds per cubic foot, said silica being admixed in a proportion to provide from 20% to 60% by weight of silica in the calcined product, filtering to recover the solids admixture, and calcining said admixture until it has after grinding a bulk density of from 45 pounds to 85 pounds per cubic foot when of a particle size such that substantially all particles are less than 200 mesh.

13. Process as in claim 12 wherein the silica has a maximum particle size of about 50 millimicrons diameter and a bulk density of about 2 to 5 pounds per cubic foot.

14. Process as in claim 12 wherein the silica is that deposited from vapors issuing from a zone wherein ferro-silicon is being produced.

15. Process as in claim 12 wherein the silica is diatomaceous earth.

16. Process as in claim 12 wherein said magnesium compound and said silica are admixed in proportions to provide 2 mols of magnesia per 1 mol of silica in the calcined product.

17. Process as in claim 12 wherein said admixture is prepared by mixing said silica and an aqueous magnesium salt solution and then precipitating said magnesium compound from the salt solution.

18. Process as in claim 12 wherein said admixture is prepared by mixing said silica and an aqueous magnesium salt solution and then adding an alkali and thereby precipitating magnesium hydroxide from the salt solution.

19. In a process of producing shaped refractories, the steps which comprise preparing a batch of crushed and sized non-acid refractory grains, admixing therewith a tempering amount of water containing dissolved magnesium sulfate in an amount of from 1% to 4% based on the total weight of the mix, then admixing from about 5% to about 50% based on the total weight of the mix of a reactive forsteritic bond-forming material consisting essentially of a calcined material prepared by thoroughly interdispersing in a slurry a magnesium compound which will yield magnesia upon calcining and from 20% to 60%, based on the total weight of MgO and $SiO_2$ in said bonding material, of finely divided silica having a bulk density of less than about 25 pounds per cubic foot and a specific surface of at least 6000 square centimeters per gram and calcining said interdispersed material until it has a bulk density of from 45 to 85 pounds per cubic foot when of a particle size such that substantially all particles are less than 200 mesh.

LESLIE W. AUSTIN.
JAMES C. HICKS.

REFERENCES CITED

The following references are of record in the file of this patent:

UNITED STATES PATENTS

| Number | Name | Date |
|---|---|---|
| 2,434,451 | Austin | Jan. 13, 1948 |